United States Patent Office 2,708,666
Patented May 17, 1955

2,708,666

CATIONIC SURFACE ACTIVE AGENTS

Joseph Emmett Carpenter, Greenwich, Conn., assignor to American Cyanamid Company, New York, N. Y., a corporation of Maine No Drawing. Application August 28, 1953,
Serial No. 377,249

9 Claims. (Cl. 260—97.5)

This invention relates to cationic surface active agents prepared from polyalkylene polyamines and certain inert, cyclic, carboxylic acids such as the rosin acids. More particularly, this invention relates to a process of preparing such products in which an epihalohydrin is used to link together a hydrocarbon radical $R_1$ of the aforesaid cyclic carboxylic acids with a nitrogen atom of a polyalkylene polyamine, yielding products which are halide salts of amino esters and contain the radical $R_1$—CO—O—$CH_2$—CHOH—$CH_2$— attached to nitrogen of the polyamine.

It is known that most carboxylic acids, for example, the fatty acids, react with polyalkylene polyamines at temperatures above 100° C., to acylate the polyamine, the ordinary product being an amide of which the following structure is representative:

I. 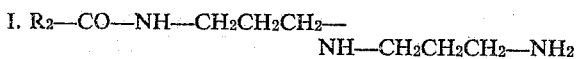

where $R_2$ is a straight chain aliphatic hydrocarbon radical. In the case of the polyethylene polyamines, imidazoline ring closure is also possible at higher temperatures, giving, in addition to the amides, compounds such as

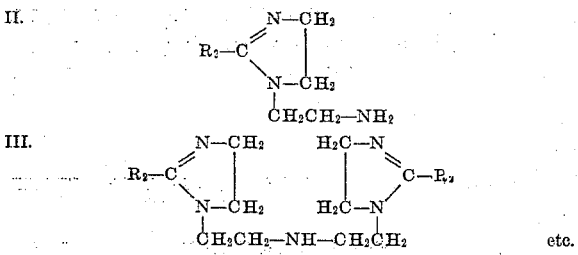

etc.

Such structures will also be referred to herein as acylated polyalkylene polyamines.

Acylated polyalkylene polyamines of both the open chain and ring closed varieties described above are known to be valuable cationic surface active agents, when prepared from fatty acids of about 8 to 30 carbon atoms chain length. It would naturally be desirable to use other varieties of carboxylic acids as sources of the hydrocarbon portion of such molecules, and particularly to use the rosin acids wholly or in part for such purposes. The rosin acids, including hydrogenated and dehydrogenated rosin acids as well as abietic acid and it isomers, constitute a cheap and plentiful source of high molecular weight carboxylic acids. The mixture of rosin and fatty acids known as tall oil and obtained as a by-product in the paper-making industry, provides an especially economically attractive starting material for the preparation of surface active agents. However, the rosin acids are typical sterically hindered cyclic carboxylic acids and are so inert in the direct reaction with polyalkylene polyamines that it heretofore has not been possible to obtain satisfactory products in this manner.

The reactivity of the rosin acids with amines varies appreciably with the rosin acid isomers involved. Even with the more reative types, however, it is necessary to use a high temperature or an extremely long reaction time to obtain an acceptable degree of reaction, and under these conditions discoloration and decomposition takes place which makes the products unsuited for many uses. Reaction products of tall oil and polyalkylene polyamines have been made in which the reaction of the fatty acids has been complete but that of the rosin acids very incomplete, but these compounds have found only limited application. The presence of unreacted rosin acids in such products is generally objectionable, as, for example, in the case of cationic flotation reagents, in which the anionic collecting power of the free rosin acids impairs selectivity to a considerable degree.

Statements have been made in the chemical and patent literature which infer that complete reaction of rosin acids may be obtained by direct reaction of polyalkylene polyamines with rosin or tall oil, but, characteristically, such instances are never accompanied by analytical data to prove the correctness of such an assumption. The rosin acids of tall oil are, as a matter of fact, among the most inert of the rosin acids and neither a high temperature nor a long reaction time will give an acceptable degree of reaction. Even under very favorable reaction conditions the degree of reaction of the tall oil rosin acids will not exceed 30–40% and will usually be much less. Accordingly, when a rosin acid or a mixture of rosin acid and fatty acid is heated with a polyalkylene polyamine, the product consists of a mixture of acylated polyamines together with unreacted rosin acids and usually some completely unreacted polyamine.

In accordance with the present invention, I have discovered that when an epihalohydrin is added to such a mixture of polyalkylene polyamines, acylated polyalkylene polyamines and unreacted rosin acids, an exothermic reaction occurs, bringing about substantially complete reaction of the rosin acids and yielding a product having extremely effective cationic surface active properties.

Epichlorohydrin, epibromohydrin and epiiodohydrin are all equally usable in this reaction, which proceeds by opening of the epoxy ring to form an ester of the rosin acid and a hydroxyl group. The halogen (X) in the 3-halo-2-hydroxypropyl ester.

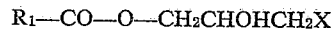

transiently formed, simultaneously reacts with amino nitrogen, alkylating it and forming halide salts. Thus the residue from the epihalohydrin becomes a link to join together a hydrocarbon radical $R_1$ from a rosin acid with an amino nitrogen atom from a polyamine, to give products with surface active properties similar to those of salts of the previously described condensates of fatty acids with polyalkylene polyamines. The alkylation of the polyamine may yield quaternary ammonium salts as well as simple hydrohalides, and both types are to be understood to be included in the term "halide salt" as used herein.

The reaction of the epihalohydrin is catalyzed by amines and, therefore, proceeds extremely easily under the reaction conditions of this invention. It appears to take place with the sterically hindered, cyclic carboxylic acids with no noticeably greater difficulty than with fatty acids, despite the inertness of the former class of acids in most other reactions. It is also an advantage of this invention that although very little fatty acid will ordinarily remain in the reaction mixture following the first stage of reaction, the epihalohydrin will also esterify any such acids which might have escaped reaction in that stage.

The epoxy ring of the epihalohydrin will also react to a minor extent with primary and secondary amine groups and with hydroxyl, the latter being present through its formation in the previous opening of an epoxy ring. These two side reactions are catalyzed by water and are not important so long as substantially anhydrous reaction conditions are maintained. The preliminary step between the organic acids and the polyamine before the epihalohydrin is added, however, provides an extremely efficient drying operation. It is desirable to include it even in cases where very little reaction between the organic acids and polyamine is to be expected, inasmuch as both commercial acids and polyamines frequently contain small amounts of water as impurities.

The preferred method of preparing the products of the present invention, therefore, consists of two stages of reaction, in the first of which a rosin acid or a mixture of rosin acids and fatty acids is heated with polyalkylene polyamine, and in the second of which the partially reacted product so obtained is further reacted with an epihalohydrin to form the novel cationic surface active agents of this invention.

When mixtures containing substantial proportions of fatty acids are used, it is important to conduct the reaction between the fatty acid and the polyalkylene polyamine so as to obtain a high degree of reaction of the fatty acids. If this reaction is insufficiently complete in the first stage of reaction, it may continue to some extent during the second stage of reaction. As this reaction produces water, it is objectionable both because it accelerates the undesirable reaction of the epoxy ring with amine groups, and because it causes spattering and foaming. However, when substantial amounts of fatty acids are present in the first stage of reaction, by conducting this reaction so as to obtain an adequate degree of reaction of these fatty acids, the probability of reaction of the epoxy ring of the epihalohydrin with amine groups will actually be considerably diminished, since the reaction of the fatty acids with the polyamine will consume the more reactive primary amine groups and make them unavailable for reaction with the epoxy ring.

The first stage of reaction in the preparation of the novel products of this invention is conducted at temperatures between about 120° C. and 300° C., with provision for the escape of water formed in the reaction. The partially reacted mixture so obtained is cooled below the boiling point of the epihalohydrin to be added, (117° C. for epichlorohydrin), and preferably to about 50–75° C. The addition of epihalohydrin to this mixture results in a spontaneous and exothermic reaction, causing the temperature to rise usually to somewhat over 100° C., sometimes with temporary refluxing of the epihalohydrin. It is sometimes advantageous to add the epihalohydrin in portions, and an inert solvent, such as toluene, pine oil, tertiary butyl alcohol, and the like, may be used if desired. Following the spontaneous reaction, it is generally desirable to hold the temperature at about 100° C. for an hour or two, or at somewhat higher temperatures for shorter times to insure completion of the reaction. Temperatures up to about 200° C. may be used, although danger of discoloration and decomposition of the final reaction product may begin at about this point.

When tall oil, or other mixtures containing fatty acids is used as the source of rosin acid in the preparation of the products of this invention, the reaction of the fatty acids with the polyalkylene polyamine will produce acylated polyamines such as those previously illustrated by Formulas I, II and III. The subsequent reaction with epihalohydrin may accordingly produce materials in which the chemical species of this invention are in admixture with these types of condensates. It is not to be supposed, however, that such mixtures will always or even more generally result by the two-stage reaction of this invention. The transient formation of the ester $R_1-CO-O-CH_2-CHOH-CH_2X$ from the rosin acid and epihalohydrin can be followed immediately by reaction either with a previously unreacted polyamine molecule or with a polyamine molecule which has been acylated by the fatty acid but still contains one or more basic amino nitrogen atoms. In the latter case, chemical species will be formed which will contain hydrocarbon radicals from the fatty acids but which are nevertheless true chemical representatives of the products of this invention. In fact, by the proper choice of proportions, I can combine virtually all of the fatty acid in such molecular species, as, for example, in the following compound derived from diethylene triamine:

IV.

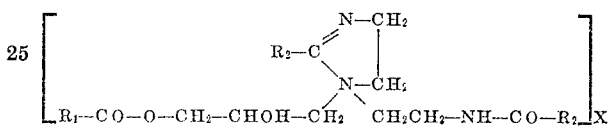

where $R_1$ is a hydrocarbon radical derived from a rosin acid, $R_2$ is a hydrocarbon radical derived from a fatty acid, and X is halogen. This illustration is extreme, in that the usual products formed by the hereindescribed reactions are complex mixtures of many molecular species. Furthermore, the products of the invention are not necessarily quaternary ammonium halides as shown in Formula IV, but may consist largely of simple hydrohalides, of which the following structure, also from diethylene triamine, provides an example.

V.

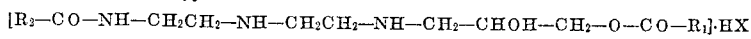

Even where little or no fatty acid is present, a large variety of molecular species are possible, as illustrated by the following structures which, for simplicity, are based on diethylene triamine:

VI.

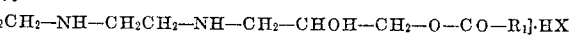

VII.

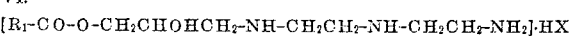

VIII.

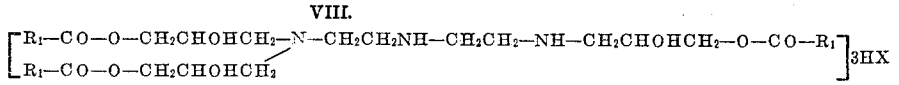

In Formulas V, VI, VII and VIII, $R_1$ and X have the significance noted above.

Although the use of tall oil constitutes one of the preferred embodiments of the present invention, it is to be understood that artificial mixtures of rosin acids with a variety of fatty acid materials, even in cases where such mixtures contain up to about 95% fatty acids are useful in the present invention. The fatty acids thus suitable for use in this invention in such admixtures are the saturated or unsaturated aliphatic straight chain acids containing from about 8 to about 30 carbon atoms. Representative higher fatty acids that may be used are lauric, palmitic, stearic, oleic, ricinoleic, capric, myristic, and mixtures of such acids. The esters of these acids, and especially the glyceride esters may likewise be used, and it is to be understood that these materials are embraced in the term "fatty acid material" as used herein.

A variety of polyalkylene polyamines may be used in preparing the products of this invention, of which the polyethylene polyamines represent an economically preferred class. More specifically, the polyalkylene polyamines may be represented as polyamines in which the nitrogen atoms are linked together by groups of the formula —$C_nH_{2n}$— where $n$ is a small integral greater than unity and the number of such groups in the molecule ranges from two up to about eight. This invention contemplates not only the use of polyamines such as diethylene triamine, triethylene tetramine, tetraethylene pentamine, dipropylene triamine, and bis(3-aminopropyl) amine, which can be obtained in reasonably pure form, but also mixtures and various crude polyamine materials. For example, the mixture of polyethylene polyamines obtained by the reaction of ammonia and ethylene dichloride, refined only to the extent of removal of chlorides, water, excess ammonia, and ethylene diamine, is a very satisfactory starting material.

It is also evident that polyalkylene polyamines containing small radicals attached to nitrogen, such as methyl, ethyl, 2- hydroxybutyl, and the like, are equally useful in most instances. Also, inasmuch as partial acylation of the polyamine by rosin and/or fatty acids occurs in the first stage of reaction, it is evidently possible to start with a polyamine originally partially acylated by such rosin or fatty acids, or by other carboxylic acids such as formic, acetic, or benzoic acid, provided that at least one nitrogen atom in the polyamine remains in a basic condition capable of taking part in the epihalohydrin reaction which follows. The term "polyalkylene polyamine" as used herein, therefore, refers to and includes not only unsubstituted polyalkylene polyamines, but also any of the alkylated or partially acylated polyalkyene polyamines referred to above, or to a mixture of such polyalkylene polyamines.

The proportions of carboxylic acid and polyalkylene polyamine in the first stage of reaction of this invention can be varied over a considerable range. In the case of mixtures containing fatty acids, consideration must be given to both the cyclic and the fatty acid constituents. The minimum proportion of polyamine must provide one chemical equivalent of amino nitrogen for each chemical equivalent of carboxylic acid present. The maximum proportion is one mol of polyamine, that is, 2,3, . . . $n$ equivalents of polyamine containing, respectively, 2,3, . . . $n$ nitrogen atoms, per equivalent of carboxylic acid. The preferred range in about 1.5 to 3.0 equivalents of amino nitrogen to 1 equivalent of carboxylic acid.

The proportion of epihalohydrin in the second stage of reaction can also be varied over a considerable range. The minimum quantity of epihalohydrin must be sufficient to be chemically equivalent to the quantity of carboxylic acid present in uncombined form at the end of the first stage of reaction. This may conveniently be determined by potentiometric titration of a sample of the reaction mixture using a standardized methanol solution of potassium hydroxide. The content of uncombined carboxylic acids may also be calculated in some cases from data obtained by titration of the basic amine content of the intermediate reaction mixture with alcoholic HCl. There is no theoretical maximum quantity of epihalohydrin which might be used in this reaction, since the opening of the epoxy ring of the epihalohydrin produces a hydroxyl group with which another molecule of epoxy compound might react; but practically, the upper limit is the quantity of epihalohydrin chemically equivalent to the quantity of basic amino nitrogen present at the time of addition of the epihalohydrin. In practice, a quantity of epihalohydrin intermediate between these extremes is generally used, because of consumption of a little epoxy compound in minor side reaction; while the complete reaction of the halide portion of the molecule is facilitated by leaving amine in excess.

The products of this invention range from viscous liquids to solids, the solid character increasing as the proportion of epihalohydrin is increased. They ordinarily disperse readily in water. Occasionally when the proportion of rosin acid to be reacted and, therefore, of epihalohydrin required is quite low, products insufficiently neutralized for good water-dispersibility may be produced, and in such cases, satisfactory water dispersibility can readily be provided either by increasing the proportion of epihalohydrin beyond the theoretical minimum requirement, or by further neutralizing the product either with acids such as hydrochloric, acetic, and the like, or by reaction with alkylating agents such as benzyl chloride, ethyl bromide, dimethyl sulfate, and the like.

The novel products are highly useful as textile assistants, emulsifying agents, asphalt additives, and flotation reagents, particularly as promoters in the flotation of acidic siliceous gangue. An important use of these products is in fields requiring cationic surface active agents resistant to hydrolysis, and in which it has hitherto been thought that compounds containing ester linkages were unsuitable. The ester linkage in the products of this invention is difficult to disrupt for the same reason of steric hindrance which makes its formation difficult by ordinary methods, and compares not unfavorably in stability with the amide linkage of cationic surface active agents from the reaction of fatty acids with polyalkylene polyamines.

The products of this invention contain hydroxyl groups from the opening of the epoxy ring of the epihalohydrin. They are, therefore, also useful as chemical intermediates for the preparation of still other types of surface active agents, as for example, by the reaction of ethylene oxide or propylene oxide to introduce polyether chains.

The invention will be described in greater detail in conjunction with the following specific examples in which the parts are by weight unless otherwise specified.

*Example 1*

313.0 parts (1 equivalent) of crude tall oil (Saponification No. 179.3, Acid No. 166.0, Rosin Acid No. 89.4, corresponding to 0.499 equivalent of rosin acids) and 53.4 parts (1.5 equivalents by titration, 0.5 mole) of diethylene triamine were mixed and heated in a flask equipped with a short fractionating column leading to a distillation condenser. Distillation began at a pot temperature of 175° C. and the reaction was stopped when the temperature reached 277° C. The distillate collected represented 17.0 parts by weight and was found to contain 0.074 equivalent of amine by titration with standard acid. Similar potentiometric titration of a sample of the intermediate condensate indicated an amino nitrogen content of 0.764 equivalent, whence $$1.5 - 0.764 - 0.074 = 0.662$$

equivalent of amine was consumed in the reaction. Therefore, 1—0.662 equivalent=0.338 equivalent of acids remaining unreacted, indicating that only $$0.499 - 0.338 = 0.161$$

equivalent or 32% of the original rosin acids had reacted. The reaction mixture was cooled and 40.4 parts (0.424 equivalent) of epichlorohydrin (equivalent weight 94.5 by analysis) was added, and the mixture warmed to 110° C. to reduce the viscosity and permit good stirring. Heating was discontinued, but heat from the spontaneous reaction took the temperature to 154° C. in a few minutes. The product was a dark, sticky solid which dispersed slowly but completely in hot water.

*Example 2*

288.0 parts (1 equivalent) of distilled tall oil (Saponification No. 194.8, Acid No. 191.5, Rosin Acid No. 53.7, corresponding to 0.276 equivalent of rosin acids), 40.0 parts (1.12 equivalent) of diethylene triamine and 99.2 parts of pine oil were heated as in Example 1. At a final temperature of 268° C., 20.0 parts of aqueous distillate had collected; it contained only 0.010 equivalent of amine. Since the proportions of ingredients in this reaction were chosen so that the number of equivalents of tall oil fatty acids were very nearly the number of equivalents of primary amine in the diethylene triamine, the quantity of water evolved for maximum possible reaction of the fatty acids and conversion to imidazoline is 19.5 parts. Potentiometric titration of a sample of the intermediate condensate indicated a content of unreacted tall oil acids of 0.292 equivalent. This exceeds slightly the original rosin acid content of the tall oil, indicating substantially zero reaction of the rosin acids. The reaction mixture was cooled and 27.6 parts (0.29 equivalent) of epichlorohydrin was introduced, and the mixture heated to 86°, at which point spontaneous reaction carried the temperature to 115° after 4 minutes. The mixture was thereafter heated again and held at 150–158° C. for 1 hour. The product was a liquid of moderate viscosity dispersed readily in cold water and emulsified its pine oil content therein. The principal component of the final product was a compound having the Formula IV identified hereinbove.

Example 3

289.6 parts (1 equivalent) of distilled tall oil (Saponification No. 193.7, Acid No. 188.0, Rosin Acid No. 55.0, corresponding to 0.284 equivalent of rosin acids), 66.4 parts (1.52 equivalent) of bis-(3-aminopropyl)-amine, and 130 parts of benzene were refluxed at 120–132° C. for 8 hours, collecting 13.4 parts of aqueous distillate in a water trap. This volume indicates substantially complete reaction of the fatty acids, and after it had collected, the rate of water formation dropped greatly. 28.4 parts (0.30 equivalent) of epichlorohydrin was added at 85° C., the temperature rising spontaneously to 117° C. The mixture was held at 95–110° C. for 2 hours and the benzene removed by vacuum distillation, the temperature not exceeding 128° C. The product was a light reddish solid which dispersed in hot water giving a foamy solution.

Example 4

322.7 parts (1 equivalent) of N-Gum Rosin (Saponification No. 173.8, Acid No. 164.6) and 118.0 parts (2.5 equivalent) of commercial tetraethylene pentamine (equivalent weight by titration 47.1) were heated under reflux with 200 parts of xylene, 3.6 parts of water collecting in a water trap in 84 minutes. About half of this water was moisture contained in the resin and came over almost immediately. Over the greater part of the heating period, the mixture refluxed at a constant temperature of 160° C. and the rate of water evolution was extremely slow. Reaction was indicated to be probably less than 15% complete. The reaction mixture was cooled to 75° C. and 190.0 parts (2.0 equivalent) of epichlorohydrin was added in four portions with cooling between additions. The first two portions, equivalent to the rosin acids to be reacted, resulted in pronounced temperature rises, the third much less so, and the fourth required refluxing for one hour at 160° C. to complete the reaction. The xylene was distilled off under vacuum, leaving a product which cooled to a resinous solid, which dispersed slowly but completely in boiling water.

Example 5

236 parts (0.75 equivalent) of NeoFat No. 17 (a distillation fraction consisting of $C_{22}$ acids, about ⅓ as glycerides, marketed by Armour and Co., Saponification No. 178.4, Acid No. 121.2), 42.6 parts (0.25 equivalent) of N-Gum Rosin and 132 parts (3.5 equivalent) of commercial triethylene tetramine (equivalent weight by titration 43.4) were heated in a flask equipped with a fractionating column leading to a distillation condenser. Boiling began at a pot temperature of 156° C., and the reaction was continued 45 minutes to a pot temperature of 267° C., with removal of 18.0 parts water. The mixture was cooled to 70° C. and 47.4 parts (0.5 equivalent) of epichlorohydrin was added. The temperature rose slowly to 142° C. but no refluxing took place. No external heat was applied in the epichlorohydrin reaction. The product, on cooling, was a dark, sticky solid which dispersed completely and easily in hot water, giving a foamy solution.

Example 6

146.0 parts (1.0 equivalent) of NeoFat No. 7 (a distillation fraction consisting of $C_8$ acids marketed by Armour and Co., Saponification No. 384.5, Acid No. 372.9), and 108.6 parts (1.03 mols) of hydroxyethylethylenediamine were reacted as in Example 5. An aqueous distillate of 37.0 parts, containing only a little amine, was produced in 83 minutes and with a final pot temperature of 284° C. The intermediate condensate was cooled, and 236.0 parts (0.75 equivalent) of abietic acid added. The mixture was heated to 150° C. to melt and dissolve and to drive off a little water contained in the abietic acid, and again cooled. 137.0 parts (1.0 equivalent) of epibromohydrin was then added in portions, with evolution of heat. When no more heat was evolved the mixture was heated to 165° C. and allowed to cool slowly, the temperature remaining above 120° C. for 1½ hours. The product was a solid, but dispersed completely in hot water.

Example 7

313.0 parts (1 equivalent) of crude tall oil (containing 0.499 equivalent rosin acids) and 100 parts pine oil (solvent) were mixed with 98.8 parts (1.39 equivalents by titration) of a methylated polyamine residue consisting largely of bis-(3-dimethylaminopropyl)-amine together with related higher molecular weight methylated polyalkylene polyamines. The mixture was reacted by heating to 211° C. over a period 26 minutes, with distillation of 10.0 parts of water. Potentiometric titrations of samples of the intermediate condensate indicated a content of unreacted tall oil acids of 0.674 equivalent and a basic amine content of 1.10 equivalents. After cooling, 104.0 parts (1.10 equivalents) epichlorohydrin were added, and after the spontaneous reaction, the mixture was held at 138–158° C. for 1 hour to complete the reaction. The product was a dark, sticky solid which dispersed in water, emulsifying its pine oil content.

Example 8

This example illustrates the utility of the products of this invention in the froth flotation of siliceous minerals. The flotation feed used in these tests was a sample of phosphate rougher concentrate, di-oiled for silica flotation in the flotation plant of the Sydney Mine near Brandon, Florida. The procedure is that of the Crago double flotation process described in U. S. Patent No. 2,293,640. The feed assayed 69.0% B. P. L. and 11.06% insoluble. A laboratory Fagergren Flotation Machine was used for the test work. Reagent quantities were: cationic reagent, 0.20 lb./ton, and kerosene, 0.50 lb./ton in all tests. The data reported in the table below show that the compounds of this invention are at least as efficient as previously known cationic flotation reagents in producing high-grade (e. g. low insoluble) phosphate concentrates with only small losses of phosphate. The novel compounds were also found to be equivalent or better in frothing characteristics and in their ability to emulsify kerosene than the conventional reagents.

| Reagent | Phosphate Product | | Silica Product | | |
|---|---|---|---|---|---|
| | Percent Wt. | Percent Insol. | Percent Wt. | Percent B. P. L. | Dist. B. P. L. |
| "A" | 89.74 | 3.22 | 10.26 | 15.15 | 2.25 |
| "B" | 90.15 | 3.09 | 9.85 | 16.67 | 2.38 |
| "C" | 90.42 | 3.44 | 9.58 | 18.61 | 2.48 |
| "D" | 88.53 | 2.33 | 11.47 | 14.71 | 2.44 |
| "E" | 88.40 | 2.42 | 11.60 | 16.64 | 2.80 |
| "F" | 88.99 | 2.92 | 11.01 | 19.37 | 3.09 |
| "G" | 88.28 | 2.19 | 11.72 | 16.98 | 2.88 |

Reagent "A", commercial tallow amine acetate, for comparison.
Reagent "B", an acetate of a condensate of acidulated cottonseed oil foots with Carbide and Carbon polyamine mixture PM 1027 (85% diethylene triamine, 15% higher polyethylene polyamines), for comparison.
Reagent "C", a condensate of a distilled tall oil (23.1% rosin acids) with PM 1027 and epichlorohydrin.
Reagent "D", a condensate of a distilled tall oil (27.6% rosin acids) with PM 1027 and epichlorohydrin.
Reagent "E", a condensate of a distilled tall oil (30.1% rosin acids) with PM 1027 and epichlorohydrin.
Reagent "F", a condensate of crude tall oil (49.9% rosin acids) with PM 1027 and epichlorohydrin.
Reagent "G", a condensate of a mixture of low rosin tall oil fatty acids and distilled tall oil (resultant rosin acids, 16.7%) with diethylenetriamine and epichlorohydrin.

I claim:

1. A quaternary ammonium salt of the structure

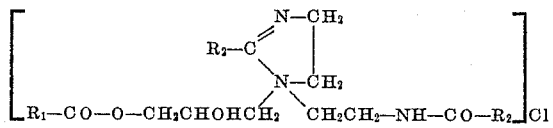

wherein $R_1$ is a hydrocarbon radical of a tall oil rosin acid and $R_2$ is a hydrocarbon radical of a tall oil fatty acid.

2. In a process of preparing cationic surface active agents, the step which comprises adding an epihalohydrin to a mixture of a polyalkylene polyamine and a carboxylic acid selected from the group consisting of rosin acids, hydrogenated rosin acids and dehydrogenated rosin acids, the quantity of epihalohydrin being at least equivalent chemically to the quantity of carboxylic acid in the mixture.

3. In a process according to claim 2, wherein the polyalkylene polyamine contains at least one radical selected from the group consisting of alkyl and hydroxyalkyl radicals of not more than four carbon atoms attached to a nitrogen atom of the polyalkylene polyamine.

4. In a process according to claim 2, wherein the polyalkylene polyamine is acylated on a nitrogen atom by a carboxylic acid containing a hydrocarbon radical of not more than 30 carbon atoms.

5. In a process of preparing cationic surface active agents, the step which comprises adding an epihalohydrin to a mixture of a polyethylene polyamine and a carboxylic acid selected from the group consisting of rosin acids, hydrogenated rosin acids, and dehydrogenated rosin acids, the quantity of epihalohydrin being at least equivalent chemically to the quantity of carboxylic acid in the mixture.

6. In a process according to claim 5, wherein the polyethylene polyamine contains at least one methyl group attached to nitrogen.

7. In a process according to claim 5, wherein the polyethylene polyamine is acylated on a nitrogen atom by a carboxylic acid containing an aliphatic hydrocarbon radical of 8 to 30 carbon atoms.

8. In a process of preparing cationic surface active agents the step which comprises adding epichlorohydrin to a mixture of a rosin acid and a polyethylene polyamine selected from the group consisting of triethylene tetramine and tetraethylene pentamine.

9. In a process of preparing cationic surface active agents, the step which comprises adding epichlorohydrin to a mixture of a rosin acid and diethylene triamine which has been previously acylated on not more than two nitrogen atoms of oleic acid.

References Cited in the file of this patent

UNITED STATES PATENTS

| 2,540,678 | Kelley | Feb. 6, 1951 |
| 2,636,028 | Sommer et al. | Apr. 21, 1953 |
| 2,640,822 | Harman et al. | June 2, 1953 |
| 2,668,165 | Carpenter | Feb. 2, 1954 |